Sept. 28, 1948. C. M. ANGEL ET AL 2,450,267

WATER GAUGE

Filed Oct. 17, 1946

CHARLES M. ANGEL
ROBERT A. CULBERTSON
INVENTORS

BY Walter E. Wallheim
ATTORNEY

Patented Sept. 28, 1948

2,450,267

UNITED STATES PATENT OFFICE 2,450,267

WATER GAUGE

Charles M. Angel and Robert A. Culbertson, Huntington, W. Va., assignors to Nathan Manufacturing Company, New York, N. Y., a corporation of New York Application October 17, 1946, Serial No. 703,922

1 Claim. (Cl. 73—293)

This invention relates to electric illumination of gauge glasses for boilers and other containers which results in free and unrestricted vision at all times of the height of the liquid in such a glass.

The invention is particularly applicable to water gauges used on locomotives to indicate the true level of the water in the steam boiler; however, it is understood that the invention may be employed on gauges of any other liquid container.

Heretofore gauges showing liquid levels have been illuminated by placing a light in front or at the side of the gauge, or at other suitable locations. When light is projected directly against the outside of a glass of such a gauge, objectionable glare or reflections are present in the glass which make it difficult at times for the operator to see the true level of the water in a steam boiler. This condition may cause an explosion with accompanying loss of life. The instant improvements in electric illumination of the gauge eliminate this condition and introduce a high factor of safety in steam boiler operation.

It is the principal object of the invention to provide means which introduce light into the gauge structure itself by directing a beam of light lengthwisely into the glass, whereby the space immediately behind the glass will be illuminated and whereby the meniscus, indicative of the level of the water in the gauge, can be observed clearly because of the absence of objectionable glare or reflections.

Other objects will become apparent in the following specification and the accompanying drawings in which a preferred embodiment of the invention is shown.

In the drawings.

Like characters of reference denote similar parts throughout the several views and the specification.

Figure 1:
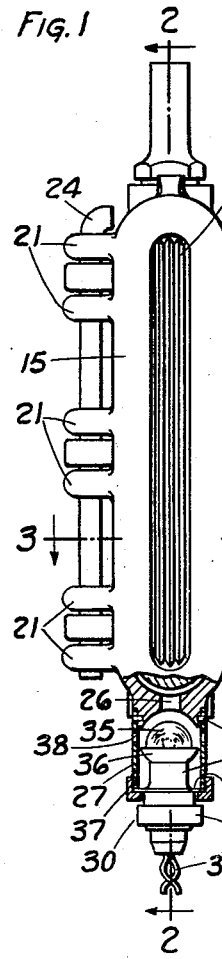
Fig. 1 is a front view of a gauge embodying the invention, partly in section.

10 is a gauge casing of elongated form having a sight opening 11 and ends 12 into which tubular stems 13 are screwed for insertion into the usual type of boiler fittings. Opening 11 is surrounded by a flat face 14. 15 is a front frame of the gauge, also of elongated form and having a sight opening 16 substantially the same as opening 11 in casing 10 and a flat face 17 surrounding opening 16 opposite face 14. 18 is a glass or other translucent member of elongated form somewhat larger than openings 11 and 16 and adapted to be placed between faces 14 and 17. Glass 18 is provided with prismatic corrugations as its inner surface. Gaskets 19 and 20 at faces 14 and 17 enable the glass 18 to make steam and water tight joints therewith.

Frame 15 is provided with pairs of spaced lugs 21 within which are placed ends 22 of yokes 23 and fulcrumed thereon by means of removable rods 24. Each of yokes 23 which straddle the back of casing 10 has a set screw 23a in its center adapted to bear against the casing and thus draw together glass, gaskets, frame and casing making tight joints between them.

So far the gauge described is of a commercial type, well known in the art. We shall now describe our particular improvements to gauges of this or similar type.

Figure 2:
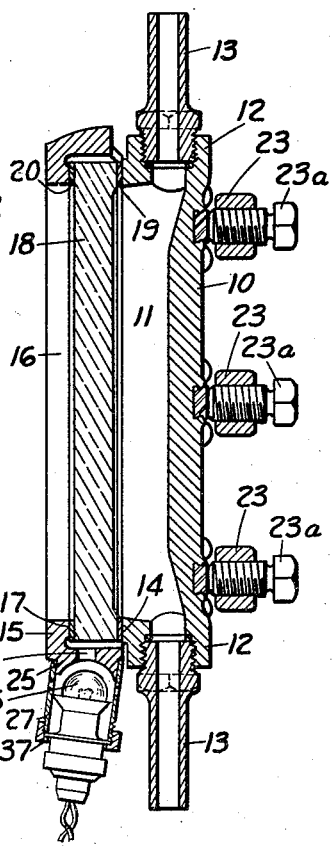
Fig. 2 is a longitudinal sectional view along the plane of line 2—2, the improvements being shown partly in elevation.
Figure 4:
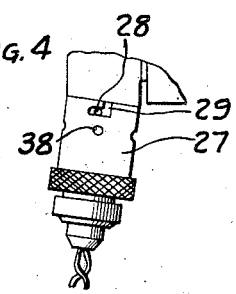
Fig. 4 is a fragmentary side view of the lower part of the gauge.

Referring to Figs. 1 and 2, the bottom of the frame 15 has a short extension 25 disposed at a slight angle with the longitudinal axis of the glass with an opening 26 in line with glass 18 and adjacent its bottom. 27 is a tubular sleeve fastened to extension 25 by the so called "bayonet" means comprising a pin 28 projecting from extension 25 and engaging an L-shaped slot 29, as shown in Fig. 4. 30 is a lamp socket of any suitable construction. For illustration sake it comprises a holder 31, a shoulder 32 adapted to seat against the end of sleeve 27, cap 33, and cord 34. To this socket is suitably attached a lamp bulb 35 and, preferably, a reflector 36. The entire socket assembly is removably fastened to the sleeve 27, which is threaded at its lower end, by a nut 37. 38 are vent holes through the sides of sleeve 27.

Figure 5:
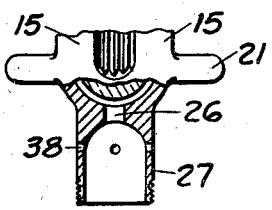
Fig. 5 is a modified construction of the bottom of the gauge.
Figure 3:
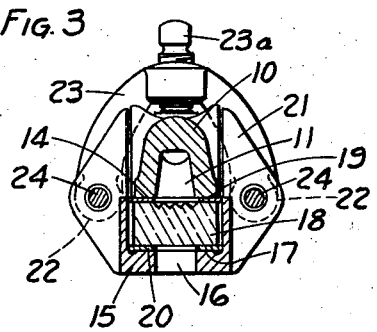
Fig. 3 is a cross sectional view along the plane of line 3—3 in Fig. 1.

In the modification, shown in Fig. 5, the sleeve 27 is made an integral part of the frame 15 adapted to receive the same lamp socket illustrated in Fig. 1.

It will be evident that when the electric lamp bulb is switched on, the rays of light from the bulb due to the angular position of the bulb are projected through the opening 26 and glass 18 toward the meniscus of the liquid which then has the appearance of a bright highly illuminated line against the background of the casing 10, readily observable from the front of the gauge. The rays of light being projected directly into the glass, there is no objectionable glare, nor are reflections present on the outer surface of the glass. This is most advantageous as compared with gauges as ordinarily constructed and in which a light is placed either in front or at the side and forward of the gauge. Clear observations can readily be made and vision is not obstructed by exteriorly supported lamps.

The angular position of the lamp also provides for more clearance between the sleeve 27 and the stem 13 at the bottom of the gauge particularly when attaching the gauge to its boiler fittings.

It is obvious that repairs can readily be made to the illuminating means and bulbs replaced without interfering with the functions of the gauge proper or requiring dismantling of the gauge.

While we have shown in the drawing a preferred embodiment of the invention and several modifications, the same is susceptible to many other changes.

So, for instance, instead of having a light at the bottom only, as shown, it could be placed at the top also, or at both the top and bottom of the gauge. While the glass is shown with inner prismatic corrugations, a plain glass may be used. The invention has been found particularly meritorious where the corrugations in the glass are worn off and the difference between steam and water is not so readily discernible. Other commercial types of lamp sockets may be substituted for the one shown in the drawings, as well as other kinds of light bulbs.

It is obvious that many changes in the form, proportion of parts and minor details of construction may be resorted to without departing from the principles or sacrificing any of the advantages of the invention as defined in the appended claims.

What we claim as new, is:

In a gauge having a casing with an elongated sight opening, a frame with an elongated sight opening, an elongated glass between said casing and frame having prismatic corrugations facing the sight opening of the casing, and means to press said casing, frame and glass together; a lamp socket at one end of said frame and being an external extension thereof disposed at a slight angle with reference to the longitudinal axis of the frame, the socket having vent openings, and an electric lamp bulb within the socket adapted to project light through an opening in said frame and through the glass against the meniscus of a liquid in the gauge, whereby the meniscus will be visible in form of a brightly illuminated undulating line.

CHARLES M. ANGEL.
ROBERT A. CULBERTSON.

REFERENCES CITED

The following references are of record in the file of this patent:

UNITED STATES PATENTS

| Number | Name | Date |
|---|---|---|
| 1,278,890 | Eibye | Sept. 17, 1918 |
| 1,772,007 | Jones et al. | Aug. 5, 1930 |
| 1,967,477 | Miller | July 24, 1934 |
| 2,246,464 | Gerber | June 17, 1941 |

FOREIGN PATENTS

| Number | Country | Date |
|---|---|---|
| 317,323 | Germany | Dec. 18, 1919 |
| 505,196 | Germany | Aug. 14, 1930 |